No. 683,693. Patented Oct. 1, 1901.
M. LARY.
APPARATUS FOR CUTTING AND MOLDING BUTTER.
(Application filed May 8, 1901.)

(No Model.) 2 Sheets—Sheet 1.

WITNESSES:
J. E. Arthur,
H. E. Chase.

INVENTOR
Morris Lary.
BY
Smith & Davidson
ATTORNEYS.

THE NORRIS PETERS CO., PHOTO-LITHO., WASHINGTON, D. C.

No. 683,693. Patented Oct. 1, 1901.
M. LARY.
APPARATUS FOR CUTTING AND MOLDING BUTTER.
(Application filed May 8, 1901.)
(No Model.) 2 Sheets—Sheet 2.
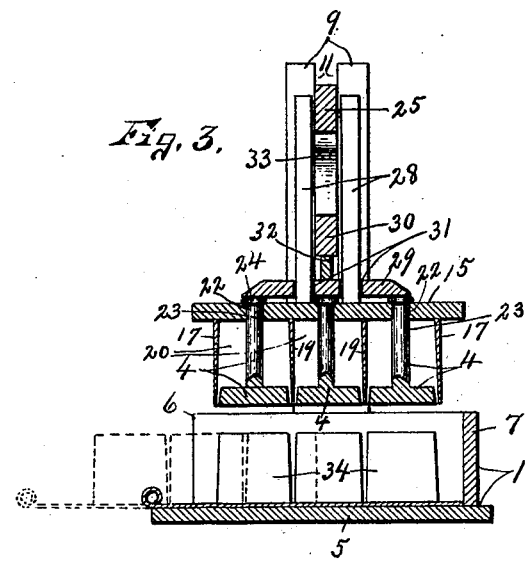
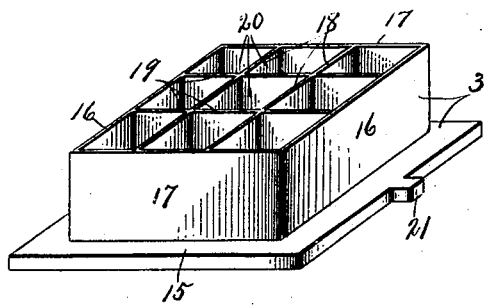
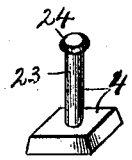
WITNESSES:
INVENTOR
Morris Lary,
BY
Smith & Neuson
ATTORNEYS.

UNITED STATES PATENT OFFICE.

MORRIS LARY, OF NEW YORK, N. Y.

APPARATUS FOR CUTTING AND MOLDING BUTTER.

SPECIFICATION forming part of Letters Patent No. 683,693, dated October 1, 1901.

Application filed May 8, 1901. Serial No. 59,288. (No model.)

*To all whom it may concern:*

Be it known that I, MORRIS LARY, of New York, in the county of New York, in the State of New York, have invented new and useful Improvements in Apparatus for Cutting and Molding Butter, of which the following, taken in connection with the accompanying drawings, is a full, clear, and exact description.

My invention relates to improvements in apparatus for cutting and molding butter.

The object of this invention is to produce a simple and practical device for cutting a body of butter into a plurality of uniform molds of substantially equal size and weight and to separate said molds one from the other, so that they may be readily handled and inclosed in a suitable envelop or package, if desired, without subsequently weighing the same.

To this end the invention consists in the construction, combination, and arrangement of the parts of a butter cutting and forming machine, as hereinafter fully described, and pointed out in the claims.

Figure 1:
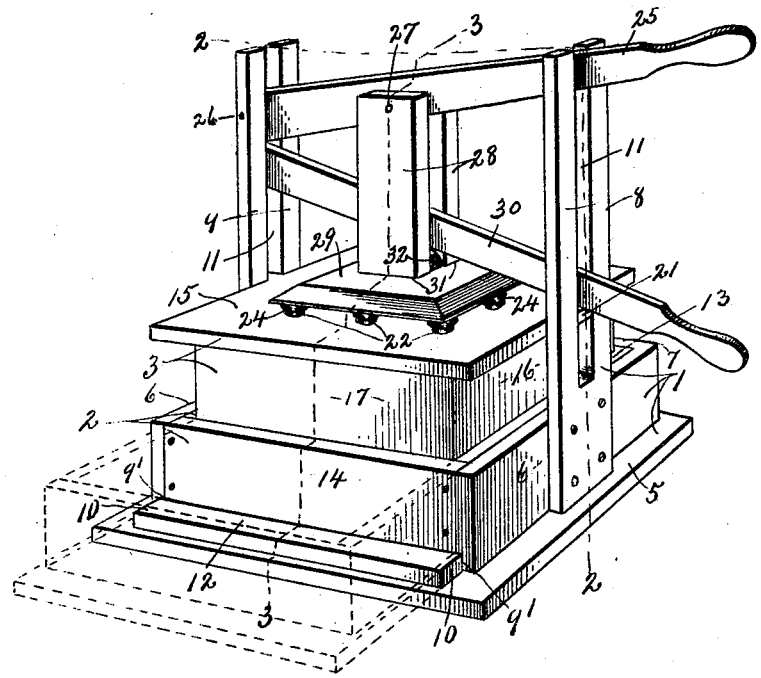
Figure 2:
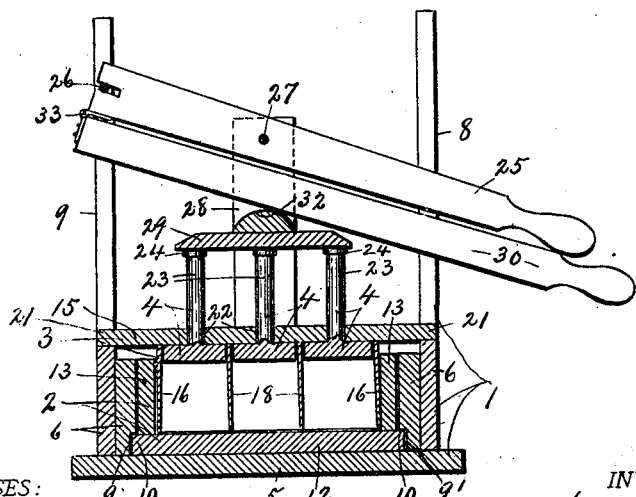

Referring to the drawings, Figure 1 is a perspective view of my invention, the butter-receptacle being shown in its normal closed position by full lines and as drawn partially outward in dotted lines. Figs. 2 and 3 are sectional views taken, respectively, on lines 2 2 and 3 3, Fig. 1. Fig. 4 is an inverted isometric view of the movable frame for cutting and forming the butter-molds. Fig. 5 is an isometric view of one of the detached plungers movable in one of the pockets of the frame seen in Fig. 4.

Similar reference characters indicate corresponding parts in all the views.

As seen in the drawings, my invention consists of a supporting-frame 1, a butter-receptacle 2, removably supported on the frame, a movable butter-cutting frame 3, a series of followers 4, means for operating the movable frame 3, and additional means for operating the plungers independently of said movable frame.

The frame 1 may be of any desired form, size, or construction, but preferably consists of a rectangular body having a base 5, upwardly-extending side and end walls 6 and 7, and separated upright standards 8 and 9, extending upwardly from the side walls 6. This supporting-frame is adapted to rest upon a suitable table or other support, and the side walls 6 and rear wall 7 form a suitable frame open at one end for receiving the tray or butter-receptacle 2, said side walls being rabbeted at 9 for receiving lateral projecting flanges 10, formed upon the base of the receptacle 2. This frame 1 is preferably open at the end opposite said end wall 7 in order that the tray or receptacle 2 may be readily moved into and out of operative position.

The upright standards 8 and 9 are secured at their lower ends to the side walls 6 and are provided with lengthwise slots 11, in which the movable frame 3 is guided, the slot in the upright standard 8 being arranged also to receive the operating-levers, presently described, for the frame 3 and plungers 4.

The tray or butter-receptacle 2 is preferably rectangular in form, is movable between the side walls 6 of the frame 1, and preferably consists of bottom, side, and end walls 12, 13, and 14, being open at its upper end for receiving the movable frame or butter-cutting member 3. This receptacle 2 is arranged to receive a quantity of butter, which is previously packed therein and substantially fills the receptacle, being rolled or otherwise pressed into a compact form and containing any predetermined weight or quantity of butter.

The frame 3 is supported in alinement with the openings in the frame 6 and receptacle 2, being reciprocally movable into and out of the butter-receptacle, and is formed of substantially the same size as the opening in said receptacle. This movable frame 3 is also rectangular in form, or rather of substantially the same form as the opening in the receptacle 2, and consists of a top wall 15, side and end walls 16 and 17, and lengthwise and transverse partitions 18 and 19, the lengthwise partitions 18 being arranged substantially parallel with the side walls 16 and the tranrverse partitions 19 being substantially parallel with the end walls 17, the partitions 18 and 19 being so arranged as to divide the chamber between the side and end walls into a series of pockets or compartments 20 of substantially equal size and form. This movable frame is provided with lugs 21, preferably extending laterally from upper wall 15 into the slots 11 of the standards 8 and 9, and serve to guide said movable frame in its reciprocal movement. The upper wall 15 is provided with a series of apertures 22, alined with the pockets 20, for receiving the plungers 4, presently described, said apertures being arranged substantially central relative to the pockets. The side and end walls 16 and 17 and the partitions 18 and 19 are formed of substantially the same depth, their lower edges being disposed in the same plane and adapted to engage the bottom wall of the receptacle 2 for the purpose of cutting entirely through the body of butter, and thereby separating said body into a series of smaller molds of equal size, form, and weight.

The plungers 4 are movable in the pockets 20, being provided with spindles 23, guided in the apertures 22, said spindles being formed with enlarged heads 24 for engaging the outer surface of the end wall 15 and preventing displacement of the plungers when the frame 3 is moved upwardly and the butter-molds are discharged therefrom, it being understood that the spindles 23 are of sufficient length to permit the plungers 4 to be moved the entire depth of their respective pockets.

The means for operating the movable frame 3 consists of a lever 25, having one end pivoted at 26 to the upright standard 9 and its other end movable in the slot 11 of the upright standard 8, the intermediate portion of said lever being pivotally connected at 27 to the posts 28, projecting upwardly from the upper wall 15 of the movable frame 3. It is evident from the foregoing description that as said lever 25 is rocked upon its pivot 26 the frame 3 is moved into and out of the receptacle 2.

The plungers 4 are preferably operated simultaneously for forcing the butter-molds from the several pockets 20. The means for operating these plungers consists of a vertically-movable plate 29 and an operating-lever 30, the plate 29 being interposed between the lever 30 and the upper ends of the spindles 23 and guided upon the posts 28, said plate being provided with openings 31 for receiving said posts and guiding the plate in its vertical movement. This plate is preferably provided at its intermediate portion with a rounding bearing-face 32, which is engaged by the lever 30, said lever being hinged at one end at 33 to the pivoted end of the lever 25 and its other end being movable in the slot 11 beneath the lever 25.

In the operation of my invention the tray or receptacle 2 is filled with a body of butter and placed in position beneath the movable frame 3. The lever 25 is then operated to force said movable frame downwardly, and the partitions 18 and 19 and side and end walls 16 and 17 serve to cut the body of butter into a series of molds, as 34. (Seen in Figs. 2 and 3.) During this operation the plungers 4 are automatically forced upwardly by impact of the butter in the several pockets. The lever 25 is then elevated for withdrawing the movable frame 3 from the receptacle 2, and thereby removes the butter from the receptacle 2, it being understood that the molds of butter are firmly packed into the several pockets and adhere to the walls of these pockets during the elevation of the frame 3. When the frame 3 is elevated, as just described, out of the path of the receptacle 2, said receptacle is removed, and a suitable tray or paper is then placed in position upon the bottom wall 5 of the frame 1 and the lever 30 is forced downwardly, thereby moving the plate 29 and simultaneously forcing the plungers downwardly for removing the several molds of butter from the pockets 20 and discharging the same upon the tray or paper previously mentioned. These molds may then be placed in a suitable cooler or sold directly from the tray, if desired.

The operation of my invention will now be readily understood upon reference to the foregoing description and the accompanying drawings, and it will be noted that the essential feature of my invention is to cut a body of butter into a series of smaller molds of uniform size and weight, thereby obviating the necessity for subsequently weighing out the butter.

Having thus fully described my invention, what I claim, and desire to secure by Letters Patent, is—

1. A machine for cutting and molding butter comprising a butter-support and a mold, one of the parts being movable toward and away from the other, a follower movable in the mold and actuated in one direction by impact with the body of butter, and manually-operated means movable independently of the follower for forcing the follower in the opposite direction to remove the butter from the mold.

2. The combination with a support for a body of butter, a movable mold having an apertured wall and a series of cutters and pockets, the cutters subdividing the body and the pockets receiving the subdivisions, and followers movable independently of each other in the pockets for removing the butter therefrom, the followers having stems guided in said apertures.

3. The combination with a support for a body of butter, a movable mold having an apertured top and wall, a series of cutters for subdividing the butter and for forming pockets receiving the subdivisions, separate followers movable in the pockets for removing the butter therefrom and having stems extending through said apertures, and means for engaging the stems and actuating the followers.

4. The combination with a support for a body of butter, a movable mold having a series of cutters subdividing the butter and forming suitable pockets receiving the subdivisions, followers movable independently of each other in the pockets for removing the butter therefrom, an operating member, and independently-movable means actuated by the operating member to simultaneously move followers for removing the butter from the pockets.

5. The combination with a frame having a removable butter-receptacle, a second frame movable into and out of the receptacle and provided with cutters and pockets, the cutters dividing the butter into smaller sections and the pockets receiving the butter-sections, means for moving the second frame, followers movable in the pockets independently of each other and of the second frame, and manually-operated mechanism movable independently of the second frame for simultaneously moving the followers to discharge the butter from the pockets.

6. An apparatus for cutting and molding butter comprising a support, a movable frame having a series of pockets each provided with a top wall having an aperture, independently-movable followers in the pockets and having stems guided in said apertures, a lever connected to the frame for raising and lowering the same independently of the followers, a plate separate from the followers and means for forcing the plate into engagement with the stem of the followers for the purpose described, said plate being adapted to be raised or lowered independently of the followers.

7. An apparatus for cutting and molding butter comprising a support, a movable frame having intersecting cutting-ribs for forming pockets, the upper end of the pockets being closed by a transverse wall fixed to the movable frame, said wall having an aperture for each of the pockets, plungers or followers movable in the pockets and provided with stems projecting through the apertures, said plungers being movable independently of each other, means movable independently of the plungers and adapted to operate said plungers to discharge the butter from the pockets, and an additional means to raise and lower the frame.

In witness whereof I have hereunto set my hand this 29th day of March, 1901.

MORRIS LARY.

Witnesses:
  MILDRED M. NOTT,
  H. E. CHASE.